United States Patent
Chen et al.

(10) Patent No.: US 11,082,983 B2
(45) Date of Patent: Aug. 3, 2021

(54) TONE PLANS AND PREAMBLES FOR EXTREMELY HIGH THROUGHPUT

(71) Applicant: Intel Corporation, Santa Clara, CA (US)

(72) Inventors: Xiaogang Chen, Hillsboro, OR (US); Ilan Sutskover, Hadera (IL); Qinghua Li, San Ramon, CA (US); Robert J. Stacey, Portland, OR (US); Thomas J. Kenney, Portland, OR (US); Feng Jiang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/566,271

(22) Filed: Sep. 10, 2019

(65) Prior Publication Data

US 2020/0008185 A1 Jan. 2, 2020

Related U.S. Application Data

(60) Provisional application No. 62/729,262, filed on Sep. 10, 2018, provisional application No. 62/739,502, filed on Oct. 1, 2018.

(51) Int. Cl.
*H04W 72/04* (2009.01)
*H04L 29/06* (2006.01)
(Continued)

(52) U.S. Cl.
CPC .......... *H04W 72/048* (2013.01); *H04B 7/046* (2013.01); *H04L 5/0023* (2013.01);
(Continued)

(58) Field of Classification Search
None
See application file for complete search history.

(56) References Cited

U.S. PATENT DOCUMENTS

| 9,883,490 B1 * | 1/2018 | Hedayat | H04W 52/0235 |
| 2013/0142095 A1 * | 6/2013 | Calcev | H04W 52/0219 370/311 |

(Continued)

OTHER PUBLICATIONS

Jinsoo Choi, View on EHT Objectives and Technologies, Jul. 9, 2018, doc.IEEE 802.11-18/1171r0 (Year: 2018).*

(Continued)

*Primary Examiner* — Lonnie V Sweet
(74) *Attorney, Agent, or Firm* — Schwegman Lundberg & Woessner, P.A.

(57) ABSTRACT

Methods, apparatuses, and computer readable media for tone plans and preambles for extremely high throughput (EHT) in a wireless network are disclosed. An apparatus of an EHT access point (AP) or EHT station (STA), where the apparatus includes processing circuitry configured to: encode a physical layer (PHY) protocol data unit (PPDU), the PPDU including a EHT preamble, the EHT preamble including a legacy preamble portion and a EHT preamble portion, the legacy preamble including a legacy short training field (L-SFT), a legacy long-training field (L-LTF), and a legacy signal field (L-SIG), the EHT preamble portion comprising an EHT short signal field (EHT S-SIG), the EHT S-SIG including a modulation and coding scheme (MCS) subfield indicating a MCS of a subsequent data portion. The PPDU may be transmitted on a distributed or contiguous resource unit (RU) allocation. The RU may be configured to not straddle two physical 20 MHz subchannels.

19 Claims, 10 Drawing Sheets

(51) Int. Cl.
  *H04L 27/20* (2006.01)
  *H04L 5/00* (2006.01)
  *H04B 7/0456* (2017.01)

(52) U.S. Cl.
  CPC .......... *H04L 5/0041* (2013.01); *H04L 5/0044* (2013.01); *H04L 27/2064* (2013.01); *H04L 69/18* (2013.01)

(56) References Cited

U.S. PATENT DOCUMENTS

| | | | |
|---|---|---|---|
| 2017/0063670 A1* | 3/2017 | Kim | H04L 27/2666 |
| 2017/0214561 A1* | 7/2017 | Lee | H04L 5/0053 |
| 2018/0146426 A1* | 5/2018 | Park | H04W 52/0216 |
| 2019/0090259 A1* | 3/2019 | Oteri | H04W 28/0242 |
| 2020/0045635 A1* | 2/2020 | Lin | H04W 52/0235 |

OTHER PUBLICATIONS

Tianyu Wu, Follow up Discussions on Throughput Enhancement, Jul. 9, 2018, doc.IEEE 802.11-17/1184r1 (Year: 2018).*

* cited by examiner

BSS

TONE PLANS AND PREAMBLES FOR EXTREMELY HIGH THROUGHPUT

PRIORITY CLAIM

This application claims the benefit of priority under 35 USC 119(e) to U.S. Provisional Patent Application Ser. No. 62/729,262, filed Sep. 10, 2018, and U.S. Provisional Patent Application Ser. No. 62/739,502, filed Oct. 1, 2018, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to tone plans and preambles for extremely high throughput (EHT).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
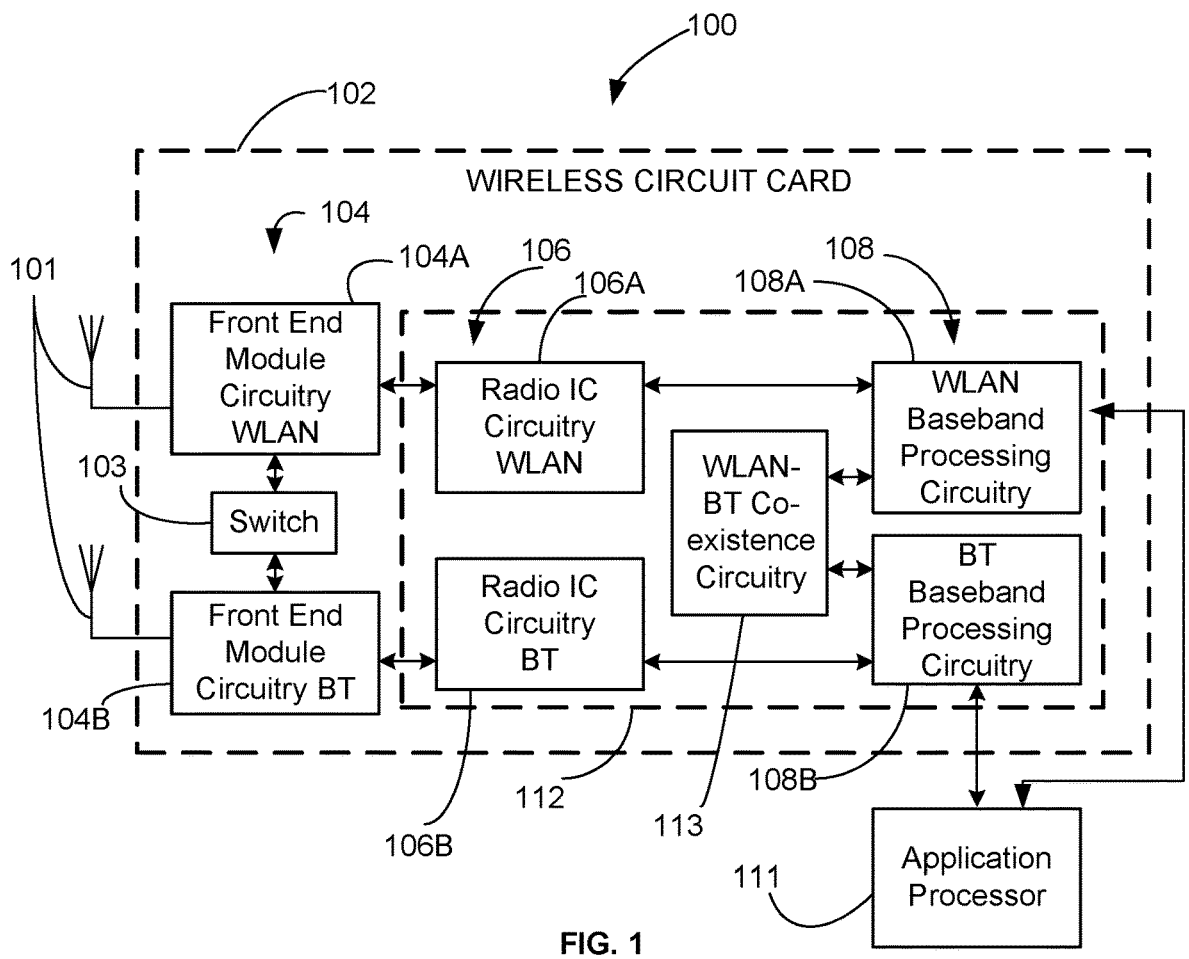
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5

MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
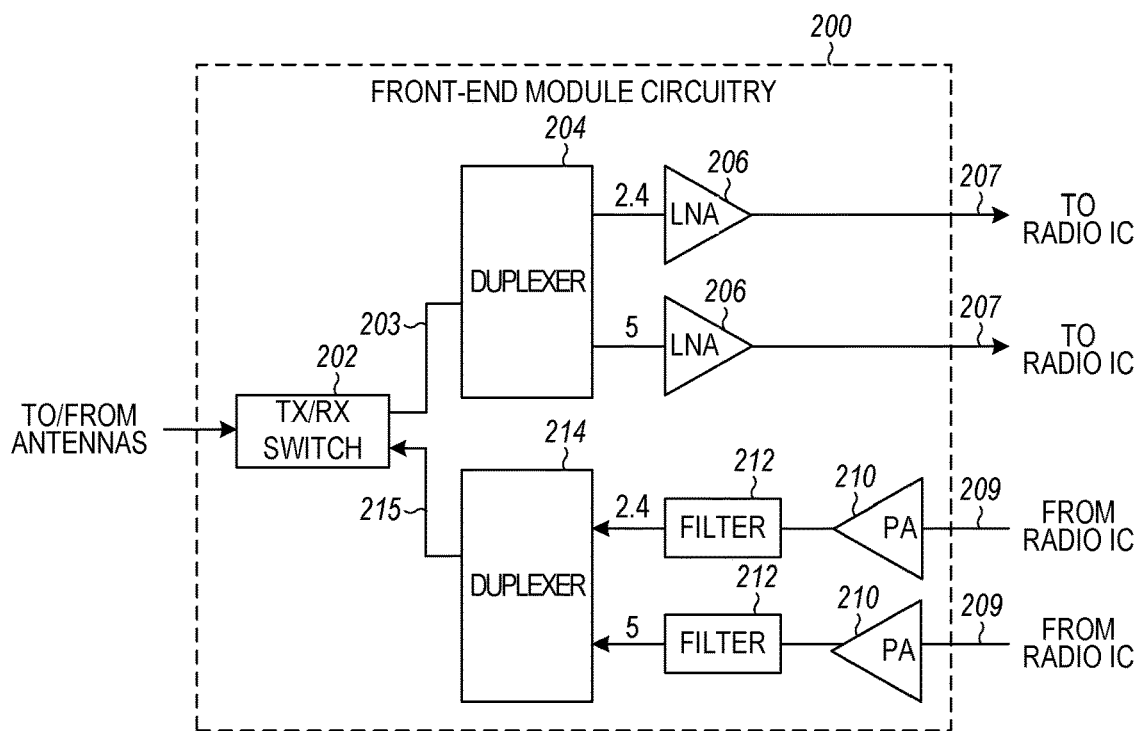
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
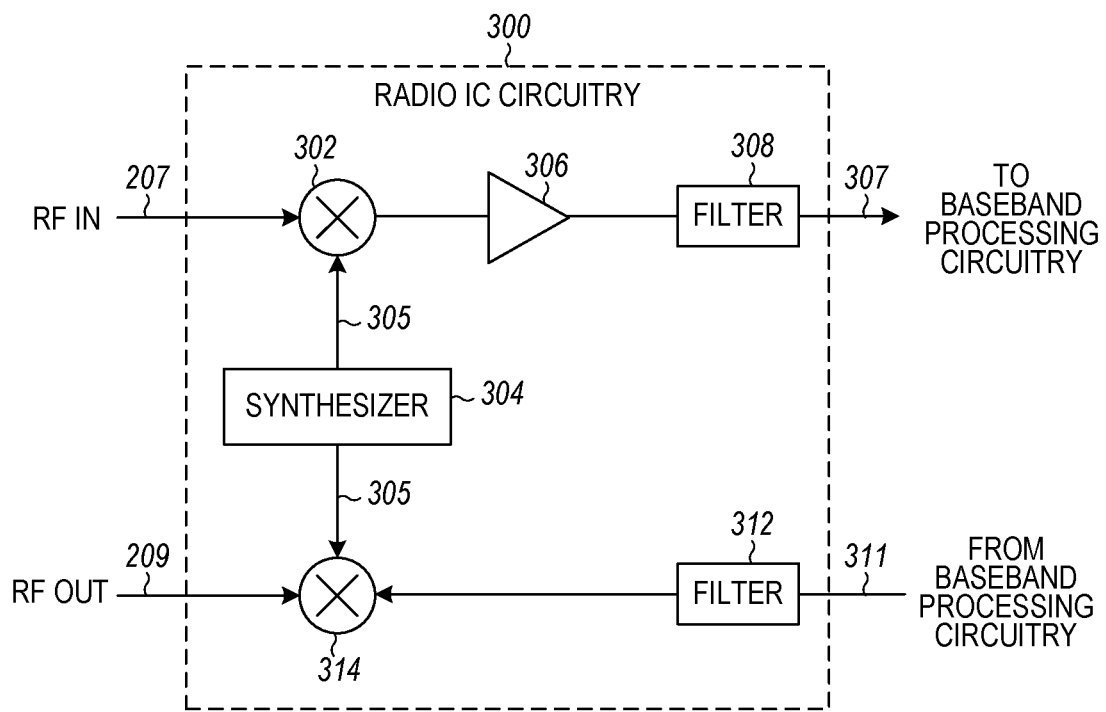
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLo) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLo).

Figure 4:
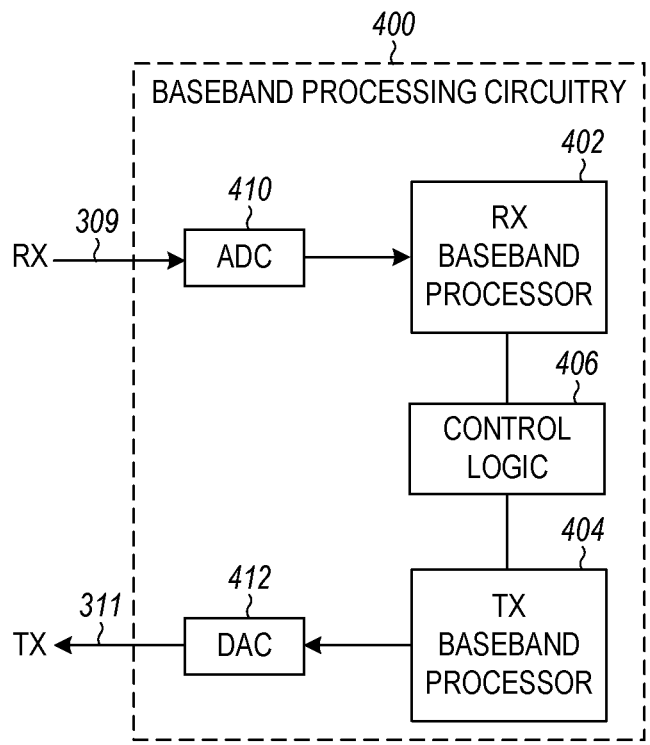
FIG. 4 illustrates a baseband processing circuitry for use in the radio architecture of FIG.1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
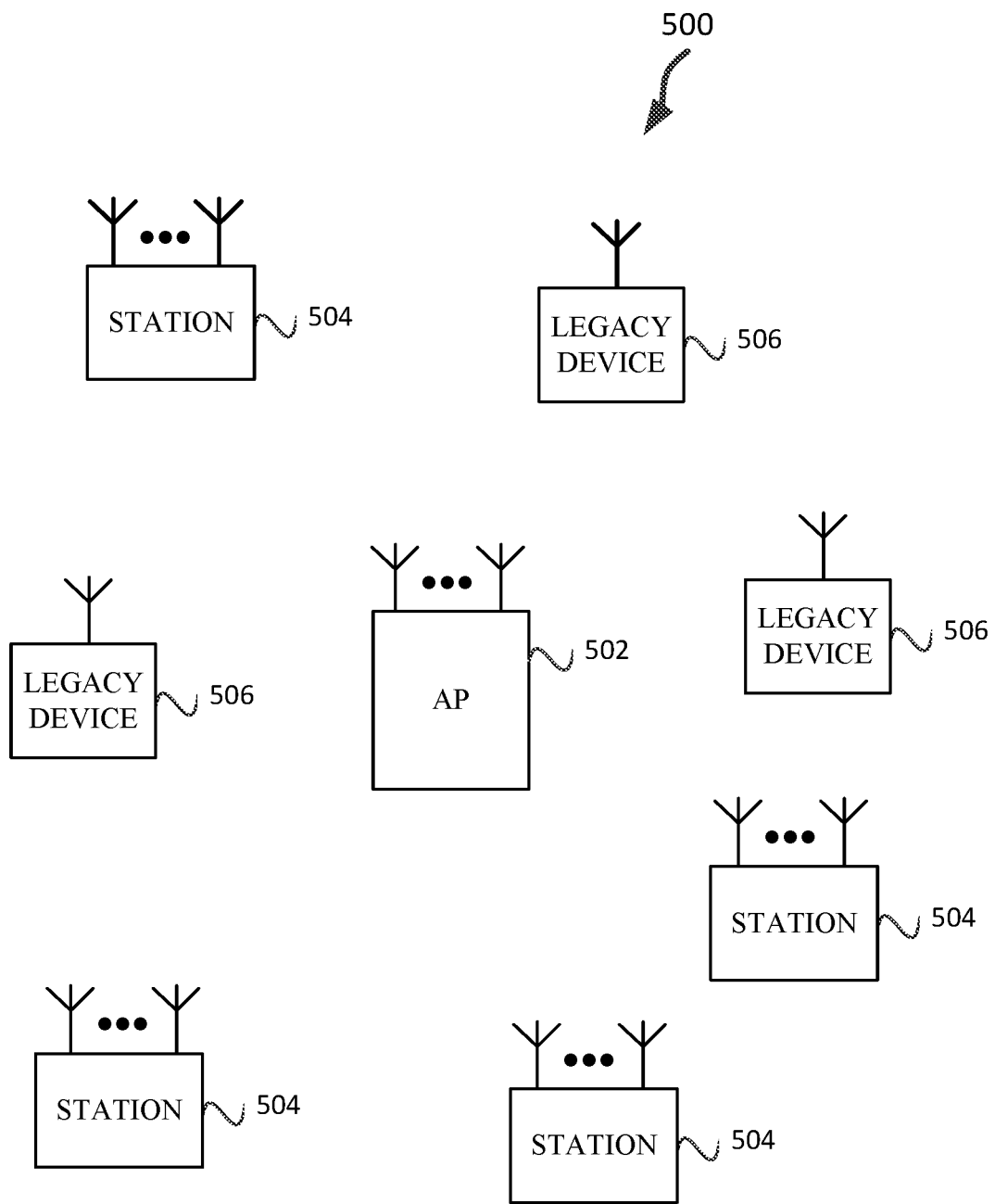
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of HE (e.g., IEEE 802.11ax) stations (STAs) 504, and a plurality of legacy (e.g., IEEE 802.11g/n/ac) devices 506. In some embodiments, the HE STAs 504 and/or AP 502 are configured to operate in accordance with IEEE 802.11 extremely high throughput (EHT). In some embodiments, the HE STAs 504 and/or HE AP 520 are configured to operate in accordance with IEEE 802.11az. In some embodiments, IEEE 802.11EHT may be termed Next Generation 802.11. In some embodiments, the AP 502 may be configured to operate a HE BSS, ER BSS, and/or a BSS. Legacy devices may not be able to operate in the HE BSS and beacon frames in the HE BSS may be transmitted using HE PPDU's. An ER BSS may use ER PPDUs to transmit the beacon frames and legacy devices 504 may not be able to decode the beacon frames and thus are not able to operate in a ER BSS. The BSSs, e.g., BSS, ER BSS, and HE BSS, may used different BSSIDs.

The AP 502 may be an AP configured to operate in accordance with IEEE 802.11 to transmit and receive. The AP 502 may be a base station. The AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. In some embodiments, IEEE 802.11 EHT is termed IEEE 802.11be. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. AP 502 may be connected to the internet.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the AP 502 and HE STAs 504 are configured to operate in accordance with IEEE 802.11EHT, the legacy devices 506 may include devices that are configured to operate in accordance with IEEE 802.11ax. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the HE STAs 504 may be termed extremely high throughput (EHT) stations or stations.

The AP 502 may communicate with legacy devices 506 in accordance with legacy IEEE 802.11 communication techniques. In example embodiments, the AP 502 may also be configured to communicate with HE STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the AP 502, HE STA 504, and/or legacy device 506 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g., IEEE 802.11EHT/ax embodiments, an AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL transmissions from HE STAs 504. The AP 502 may transmit a time duration of the TXOP and sub-channel information. During the TXOP, HE STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the AP 502 may communicate with HE stations 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or HE stations 504 in accordance with legacy IEEE 802.11 communication techniques.

In some embodiments, the AP 502 may also be configurable to communicate with HE stations 504 outside the HE TXOP in accordance with legacy IEEE 802.11 or IEEE 802.11EHT/ax communication techniques, although this is not a requirement.

In some embodiments the station 504 may be a "group owner" (GO) for peer-to-peer modes of operation. A wireless device may be a HE station 502 or an AP 502.

In some embodiments, the HE STA 504 and/or AP 502 may be configured to operate in accordance with IEEE 802.11mc. In example embodiments, the radio architecture of FIG. 1 is configured to implement the HE STA 504 and/or the AP 502. In example embodiments, the front-end module circuitry of FIG. 2 is configured to implement the HE STA 504 and/or the AP 502. In example embodiments, the radio IC circuitry of FIG. 3 is configured to implement the station 504 and/or the AP 502. In example embodiments, the base-band processing circuitry of FIG. 4 is configured to implement the station 504 and/or the AP 502.

In example embodiments, the HE stations 504, AP 502, an apparatus of the HE stations 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-11.

In example embodiments, the station 504 and/or the AP 502 are configured to perform the methods and operations/functions described herein in conjunction with FIGS. 1-11. In example embodiments, an apparatus of the EHT station 504 and/or an apparatus of the AP 502 are configured to perform the methods and functions described herein in conjunction with FIGS. 1-11. The term Wi-Fi may refer to one or more of the IEEE 802.11 communication standards. AP 502 and STA 504 may refer to EHT/HE AP and/or EHT/HE.

In some embodiments, a HE AP STA may refer to an AP 502 and/or a HE STAs 504 that is operating as a HE APs 502. In some embodiments, when a HE STA 504 is not operating as a HE AP, it may be referred to as a HE non-AP STA or HE non-AP. In some embodiments, HE STA 504 may be referred to as either a HE AP STA or a HE non-AP. AP 502 may be a HE AP and/or EHT AP 502. Station 504 may be a HE station and/or EHT station.

In some embodiments, BSS 500 may operate on a 2.4, 5 GHz and/or 6 GHz band. Station 504 and/or AP 502 may operate on a 6 GHz band. Station 504 and/or AP 502 are configured to operate using a first protocol on the 2.4 and/or 5 GHz band than on the 6 GHz band, in accordance with some embodiments.

Figure 6:
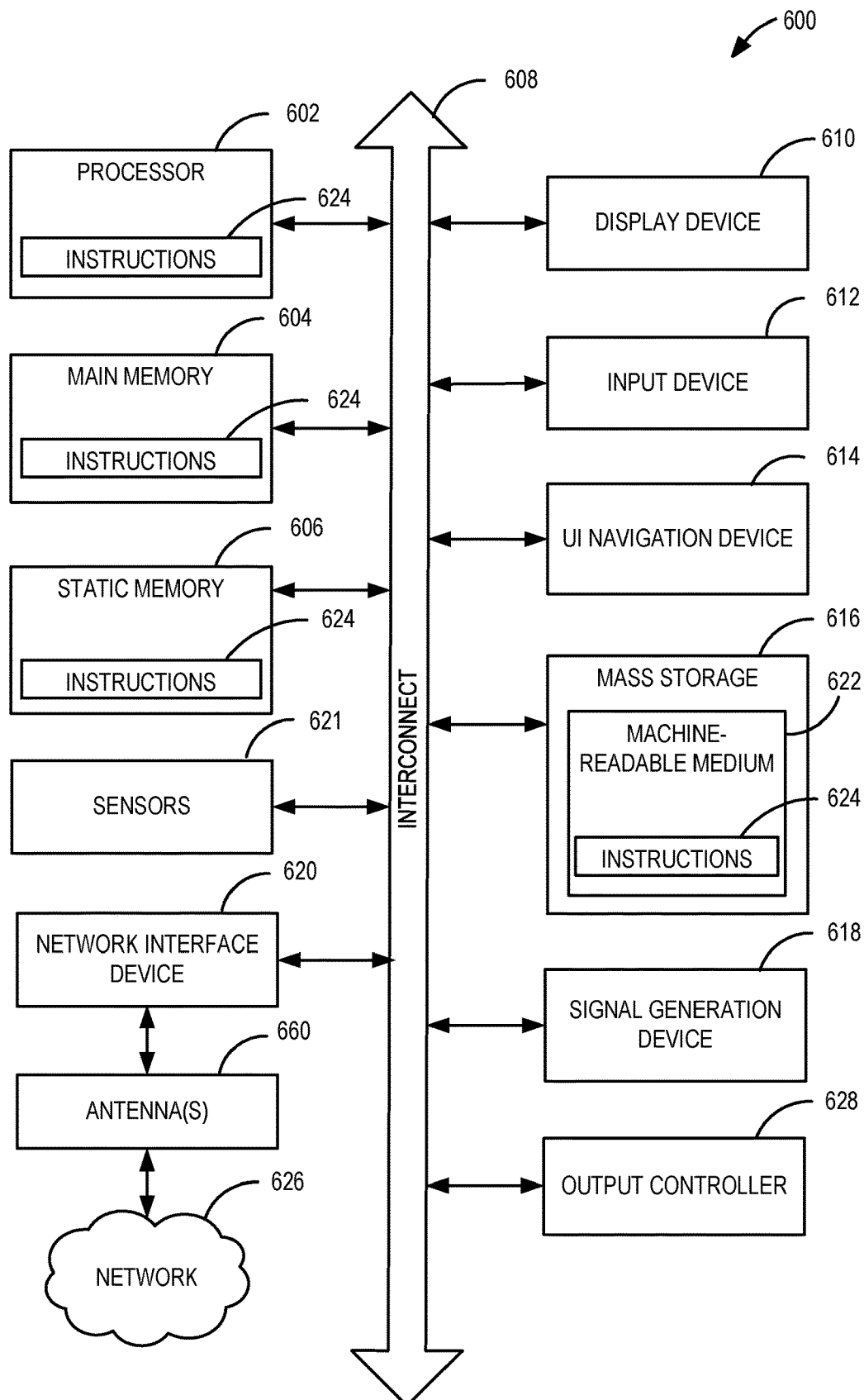
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
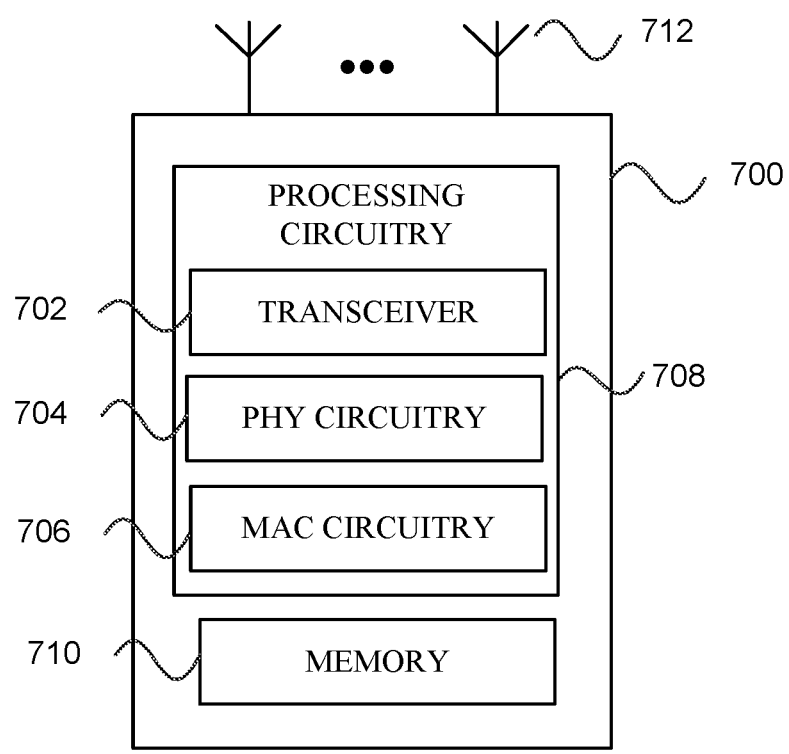
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, AP 502, and/or a HE STA or HE AP. A HE STA 504, AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Table 1 illustrates data and pilot subcarrier indices for resource units (RUs) in an 80 MHz channel. The tone plane illustrated in Table 1 illustrates tone assignments. For example, for a RU type of 26-tone RU, RU 1 is allocated tones −499 to −474. Station 504 and AP 502 are configured to operate in accordance with Table 1, in accordance with some embodiments. Station 504 and AP 502 use orthogonal frequency division multiplexing (OFDM) and orthogonal frequency division multi-access (OFDMA) to transmit on the RUs of Table 1, in accordance with some embodiments.

An OFDM symbol is constructed of subcarriers, the number of which is a function of the PPDU bandwidth and are defined in Table 1. A subcarrier may be a data subcarrier, which are used for data transmission; a pilot subcarrier, which are used for phase information and parameter tracking (and data in some embodiments); or, an unused subcarrier, which are not used for either data or pilot transmission. The unused subcarriers are the DC subcarrier, the guard band subcarriers at the band edges, and the Null subcarriers. For example, see Table 1, Table 2, and FIGS. 8 and 9. The notation [x1:y1] indicates the set of subcarriers with index k that satisfies x1<=k <=y1. The subcarrier index of 0 corresponds to the DC tone. Negative subcarrier indices correspond to subcarriers with frequency lower than the DC tone, and positive subcarrier indices correspond to subcarriers with frequency higher than the DC tone.

TABLE 1

Table 1 illustrates data and pilot subcarrier indices for resource units (RUs) in an 80 MHz channel.

| RU type | RU index and subcarrier range | | | | |
|---|---|---|---|---|---|
| 26-tone RU | RU 1 [−499: −474] | RU 2 [−473: −448] | RU 3 [−445: −420] | RU 4 [−419: −394] | RU 5 [−392: −367] |
| | RU 6 [−365: −340] | RU 7 [−339: −314] | RU 8 [−311: −286] | RU 9 [−285: −260] | |
| | RU 10 [−257: −232] | RU 11 [−231: −206] | RU 12 [−203: −178] | RU 13 [−177: −152] | RU 14 [−150: −125] |
| | RU 15 [−123: −98] | RU 16 [−97: −72] | RU 17 [−69: −44] | RU 18 [−43: −18] | RU 19 [−16: −4, 4: 16] |
| | RU 20 [18: 43] | RU 21 [44: 69] | RU 22 [72: 97] | RU 23 [98: 123] | RU 24 [125: 150] |
| | RU 25 [152: 177] | RU 26 [178: 203] | RU 27 [206: 231] | RU28 [232: 257] | |
| | RU 29 [260: 285] | RU 30 [286: 311] | RU 31 [314: 339] | RU 32 [340: 365] | RU 33 [367: 392] |
| | RU 34 [394: 419] | RU 35 [420: 445] | RU 36 [448: 473] | RU37 [474: 499] | |
| 52-tone RU | RU 1 [−499: −448] | RU 2 [−445: −394] | RU 3 [−365: −314] | RU 4 [−311: −260] | |
| | RU 5 [−257: −206] | RU 6 [−203: −152] | RU 7 [−123: −72] | RU 8 [−69: −18] | |
| | RU 9 [18: 69] | RU 10 [72: 123] | RU 11 [152: 203] | RU 12 [206: 257] | |
| | RU 13 [260: 311] | RU 14 [314: 365] | RU 15 [394: 445] | RU 16 [448: 499] | |
| 106- | RU 1 | RU 2 | RU 3 | RU 4 | |

TABLE 1-continued

Table 1 illustrates data and pilot subcarrier indices for resource units (RUs) in an 80 MHz channel.

| RU type | RU index and subcarrier range | | | |
|---|---|---|---|---|
| tone RU | [−499: −394] | [−365: −260] | [−257: −152] | [−123: −18] |
| | RU 5 [18: 123] | RU 6 [152: 257] | RU 7 [260: 365] | RU 8 [394: 499] |
| 242-tone RU | RU 1 [−500: −259] | RU 2 [−258: −17] | RU 3 [17: 258] | RU 4 [259: 500] |
| 484-tone RU | RU 1 [−500: −17] | | RU 2 [17: 500] | |
| 996-tone RU | RU 1 [−500: −3, 3: 500] | | | |

In some embodiments, there are four physical 20 MHz subchannels of the 80 MHz of Table 1 and 2. The four physical 20 MHz subchannels may be from subcarrier index −257 through −512 (e.g., CH1), −1 through −256 (e.g., CH2), 0 through 255 (e.g., CH3), and 256 through 511 (e.g., CH4). There are several RUs that straddle across two physical 20 MHz subchannels. For example, the RUs that straddle two physical 20 MHz subchannels are R10 [−257:−232] of 26-tone RUs with −257 in CH1 and −232 in CH2. R19 [−16:−4, 4:16] of 26-tone RUs with −16 in CH2 and 16 in CH3. R28 [232:257] of 26-tone RUs with 232 in CH3 and 257 in CH4. RU5 [−257:−206] of 52-tone RUs with −257 in CH1 and −206 in CH2. RU12 [206:257] of 52-tone RUs with 206 in CH3 and 257 in CH4. RU3 [−257:−152] of 106-tone RUs with −257 in CH1 and 152 in CH2. RU6 [152:257] of 106-tone RUs with 152 in CH3 and 257 in CH4. RU2[−258:−17] of 242-tone RUs with −258 in CH1 and −17 in CH2. RU3[17:258] of 242-tone RUs with 17 in CH3 and 258 in CH4. In some embodiments, RUs that straddle across two physical 20 MHz subchannels are termed ill-conditioned RUs. In some embodiments, the stations 504 transmit a PPDU, e.g., a HE TB PPDU on the RU, and when the RU is ill-conditioned, the legacy preamble portion of the HE TB PPDU is transmitted on both the 20 MHz physical channels that the ill-conditioned RU straddles.

In some embodiments, stations 504 and/or AP 502 includes transceiver 702 circuitry that is configured to tune to different 20 MHz channels. The transceiver 702 circuitry may be tuned to frequencies for four 20 MHz channels that correspond to the subcarrier indices. In some embodiments, the transceiver 702 circuitry may be tuned to more than four 20 MHz channels.

A station 504 that is allocated an RU that is an ill-conditioned RU transmits a legacy preamble (or pre-HE preamble) on more than one 20 MHz channel. Additionally, the station 504 transmitting on an ill-conditioned RU may interfere with a neighboring overlapping BSS (OBSS), e.g., the primary 20 channel of the OBSS may be different than the BSS that the station 504 is associated with, but the ill-conditioned RU may straddle both the primary 20 MHz channel of the BSS the station 504 is associated with and the primary 20 MHz channel of the OBSS. In some embodiments, the guard band in IEEE 802.11ax is smaller than a guard band of IEEE 802.11ac.

Table 2 illustrates data and pilot subcarrier indices for RUs in an 80 MHz channel. IEEE 802.11EHT may be configured to operate in accordance with Table 2, e.g., station 504 and AP 502 may operate in accordance with Table 2. The RUs of Table 2 are rotated so as not to be ill-conditioned RUs, e.g., not to have subcarriers that are included in more than one physical 20 MHz channel. The RUs that are greater than 20 MHz channels may include two or more physical channels, e.g., RU1 and RU2 of 484-tone RUs (approximately 40 MHz), and RU1 of 996-tone RUs (approximately 80 MHz).

MHz physical channel, e.g., RU10 [−249:−224] is 6 tones away from the neighboring physical 20 MHz channel, e.g., RU10 is all within CH2 and 6 tones away from CH1. A distributed RU is created by adding [−8:−4}, [4:8], [−258:−251], and [251:258] to form a 26-tone RU (e.g., a new RU 19) that is distributed.

In some embodiments, contiguous subcarriers (e.g., RU1 of the 52-tone RUs) allocations work better when the

TABLE 2

Table 2 illustrates data and pilot subcarrier indices for RUs in an 80 MHz channel.

| RU type | RU index and subcarrier range | | | | |
|---|---|---|---|---|---|
| 26-tone RU | RU 1 [−499: −474] | RU 2 [−473: −448] | RU 3 [−445: −420] | RU 4 [−419: −394] | RU 5 [−392: −367] |
| | RU 6 [−365: −340] | RU 7 [−339: −314] | RU 8 [−311: −286] | RU 9 [−285: −260] | |
| | RU 10 [−257: −232] +8 | RU 11 [−231: −206] +8 | RU 12 [−203: −178] +8 | RU 13 [−177: −152] +8 | RU 14 [−150: −125] +8 |
| | RU 15 [−123: −98] +8 | RU 16 [−97: −72] +8 | RU 17 [−69: −44] +8 | RU 18 [−43: −18] +8 | ~~RU 19 [−16: −4, 4: 16]~~ |
| | RU 20 [18: 43] −8 | RU 21 [44: 69] −8 | RU 22 [72: 97] −8 | RU 23 [98: 123] −8 | RU 24 [125: 150] −8 |
| | RU 25 [152: 177] −8 | RU 26 [178: 203] −8 | RU 27 [206: 231] −8 | RU28 [232: 257] −8 | |
| | RU 29 [260: 285] | RU 30 [286: 311] | RU 31 [314: 339] | RU 32 [340: 365] | RU 33 [367: 392] |
| | RU 34 [394: 419] | RU 35 [420: 445] | RU 36 [448: 473] | RU37 [474: 499] | |
| 52-tone RU | RU 1 [−499: −448] | RU 2 [−445: −394] | RU 3 [−365: −314] | RU 4 [−311: −260] | |
| | RU 5 [−257: −206] +8 | RU 6 [−203: −152] +8 | RU 7 [−123: −72] +8 | RU 8 [−69: −18] +8 | |
| | RU 9 [18: 69] −8 | RU 10 [72: 123] −8 | RU 11 [152: 203] −8 | RU 12 [206: 257] −8 | |
| | RU 13 [260: 311] | RU 14 [314: 365] | RU 15 [394: 445] | RU 16 [448: 499] | |
| 106-tone RU | RU 1 [−499: −394] | RU 2 [−365: −260] | RU 3 [−257: −152] +8 | RU 4 [−123: −18] +8 | |
| | RU 5 [18: 123] −8 | RU 6 [152: 257] −8 | RU 7 [260: 365] | RU 8 [394: 499] | |
| 242-tone RU | RU 1 [−500: −259] | RU 2 [−258: −17] +8 = [−250: −9] | RU 3 [17: 258] −8 = [9: 250] | RU 4 [259: 500] | |
| 484-tone RU | RU 1 [−500: −17] | | RU 2 [17: 500] | | |
| 996-tone RU | | RU 1 [−500: −3, 3: 500] | | | |

Table 2 illustrates a shifting of the RUs by 8 and some RUs being canceled. The shifting may be by another number, N, other than 8 and −8 that avoids having RUs straddle two physical subchannels. The RUs that straddled two physical 20 MHz subchannels in Table 1 now either no longer straddle two physical 20 MHz channels or they are canceled. R10 [−257:−232]+8 of 26-tone RUs with −249 in CH2 and −224 in CH2. The other RUs are similarly within one physical 20 channel by the shifting by 8 subcarriers and the canceling of the center RU, RU19. In some embodiments, the guard band is maintained as the same size in Table 2 as Table 1. In some embodiments, there are guard tones in Table 2 for some RUs that are at the edge of a 20 transmitter has reliable channel quality information (CQI) from the receiver. A distributed-tone allocations (e.g., new RU 19) work better when the transmitter does not have reliable CQI from the receiver, in accordance with some embodiments.

Figure 8:
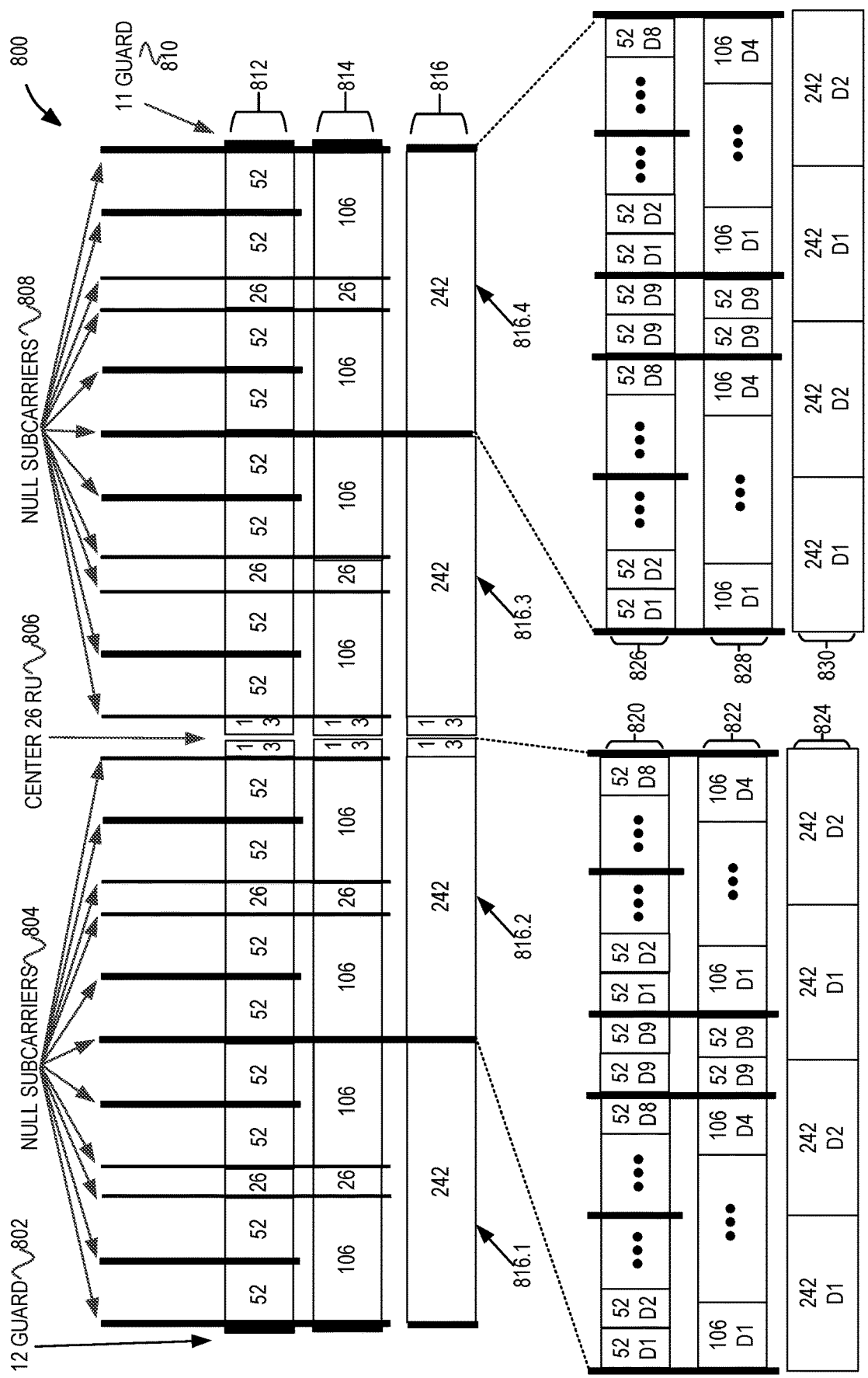
FIG. 8 illustrates distributed resource units (RUs) and contiguous RUs, in accordance with some embodiments.

FIG. 8 illustrates distributed resource units (RUs) and contiguous RUs 800, in accordance with some embodiments. Illustrated in FIG. 8 is 12 guard 802 subcarriers, null subcarriers 804, center 26 RU 806, null subcarriers 808, 11 guard 810 subcarriers, 52-tone RUs 812, 106-tone RUs 814, 242 RUs 816, distributed 52-tone RUs 820, 826, distributed 106-tone RUs 822, 828, and distributed 242-tone RUs 824, 830. The null subcarriers 804, 808 may be between RUs and not used for transmission. The 12 guard 802 subcarriers and 11 guard 810 subcarriers provide a guard between channels that are adjacent to the 80 MHz channel that is illustrated.

The 52-tone RUs 812 are contiguous 52-tone RUs that may include 26-tone RUs with the center 26 RU 806 in the center. The 106-tone RUs 814 are contiguous RUs that may include 26-tone RUs with the center 26 RU 806 in the center. The 242-tone RUs 816 are contiguous RUs with the center 26 RU 806 in the center. The 242-tone RUs 816 comprises 242 816.1, 816.2, 816.3, and 816.4.

As illustrated, the 52-tone RUs 818, 106-tone RUs 814, and 242-tone RUs 816 are replaced for those portions that fall within 242-tone 816.2 and 242-tone 816.4 with the distributed 52-tone RUs 820, 826, distributed 106-tone RUs 822, 828, and distributed 242-tone RUs 824, 830.

As illustrated, two 20 MHz channels are contiguous RUs (816.1 and 816.3) and two 20 MHz channels are distributed RUs (816.2 and 816.4). Distributed 52-tone RUs 820, 826 are distributed with 13 subcarriers over four locations indicated by four repetitions of 52 D1, 52 D2, . . . , 52 D8. Distributed 106-tone RUs 822, 828 are distributed with 26 or 27 subcarriers over four locations indicated by four repetitions of 106 D1, 106 D2, . . . , 106 D9. Distributed 242-tone RUs 824, 830 are distributed with 60 or 61 subcarriers over four locations indicated by four repetitions of 242 D1 and 242 D2. In some embodiments, the distributed RUs may be distributed differently, e.g., the distribution may be localized to one 20 MHz subchannel (e.g., 242 RU 816), two 20 MHz (as illustrated 242 RU 816.2, 816.4), three 20 MHz subchannels (e.g., 242 RU 816.1, 816.3, 816.4), or four 242 20 MHz subchannels. In some embodiments, the ordering of the distributed RUs may be different, e.g., rather than 106 D1, . . . , 106 D9 being repeated four times, the order may of 106 D1, . . . , 106 D9 may be a different. The distributed RUs are distributed across the frequency so that they provide greater frequency diversity gain, in accordance with some embodiments.

Figure 9:
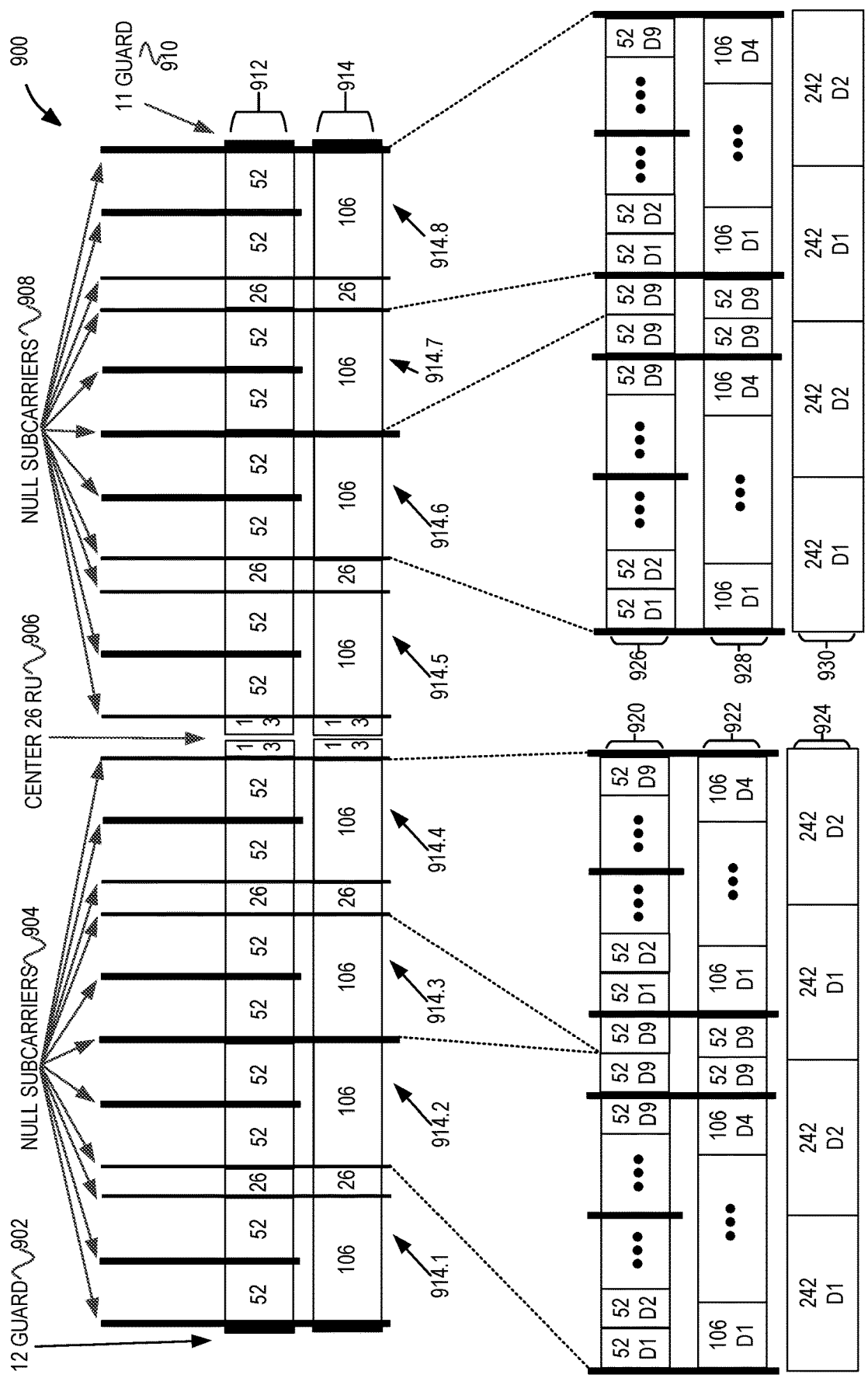
FIG. 9 illustrates distributed RUs and contiguous RUs, in accordance with some embodiments.

FIG. 9 illustrates distributed RUs and contiguous RUs 900, in accordance with some embodiments. Illustrated in FIG. 9 is 12 guard 902 subcarriers, null subcarriers 904, center 26 RU 906, null subcarriers 908, 11 guard 910 subcarriers, 52-tone RUs 912, 106-tone RUs 914, distributed 52-tone RUs 920, 926, distributed 106-tone RUs 922, 928, and distributed 242-tone RUs 924, 930. The null subcarriers 904, 908 may be between RUs and not used for transmission. The 12 guard 902 subcarriers and 11 guard 910 subcarriers provide a guard between channels that are adjacent to the 80 MHz channel that is illustrated.

The 52-tone RUs 912 are contiguous 52-tone RUs that may include 26-tone RUs with the center 26 RU 906 in the center. The 106-tone RUs 914 are contiguous RUs that may include 26-tone RUs with the center 26 RU 906 in the center. The 106-tone RUs 914 comprise 106-tone RUs 914.1, 914.2, 914.3, 914.4, 914.5, 914.6, 914.7, 914.8.

As illustrated, the 52-tone RUs 918 and 106-tone RUs 914 are replaced for those portions that fall within 106-tone 914.2, 914.4, 914.6, 914.8 with the distributed 52-tone RUs 920, 926, distributed 106-tone RUs 922, 928, and distributed 242-tone RUs 924, 930.

Distributed 52-tone RUs 920, 926 may be the same or similar as distributed 52-tone RUs 820, 826 as disclosed in FIG. 8. Distributed 106-tone RUs 922, 928 are the same or similar as distributed 106-tone RUs 822, 828 as disclosed in conjunction with FIG. 8. Distributed 242-tone RUs 924, 930 are the same or similar as distributed 242-tone RUs 824, 830 as disclosed in conjunction with FIG. 8.

Figure 10:
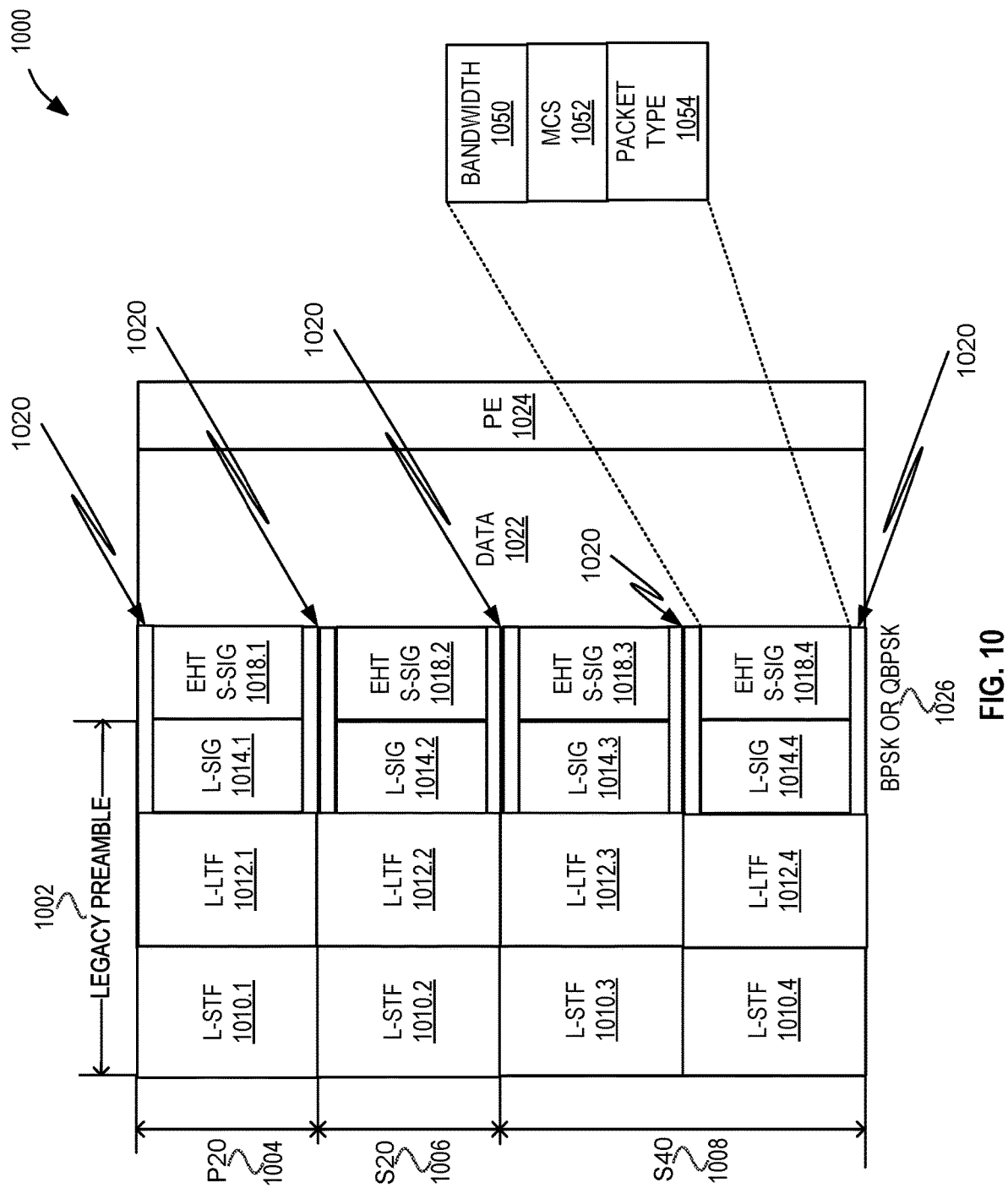
FIG. 10 illustrates a low-rate preamble, in accordance with some embodiments.
Figure 11:
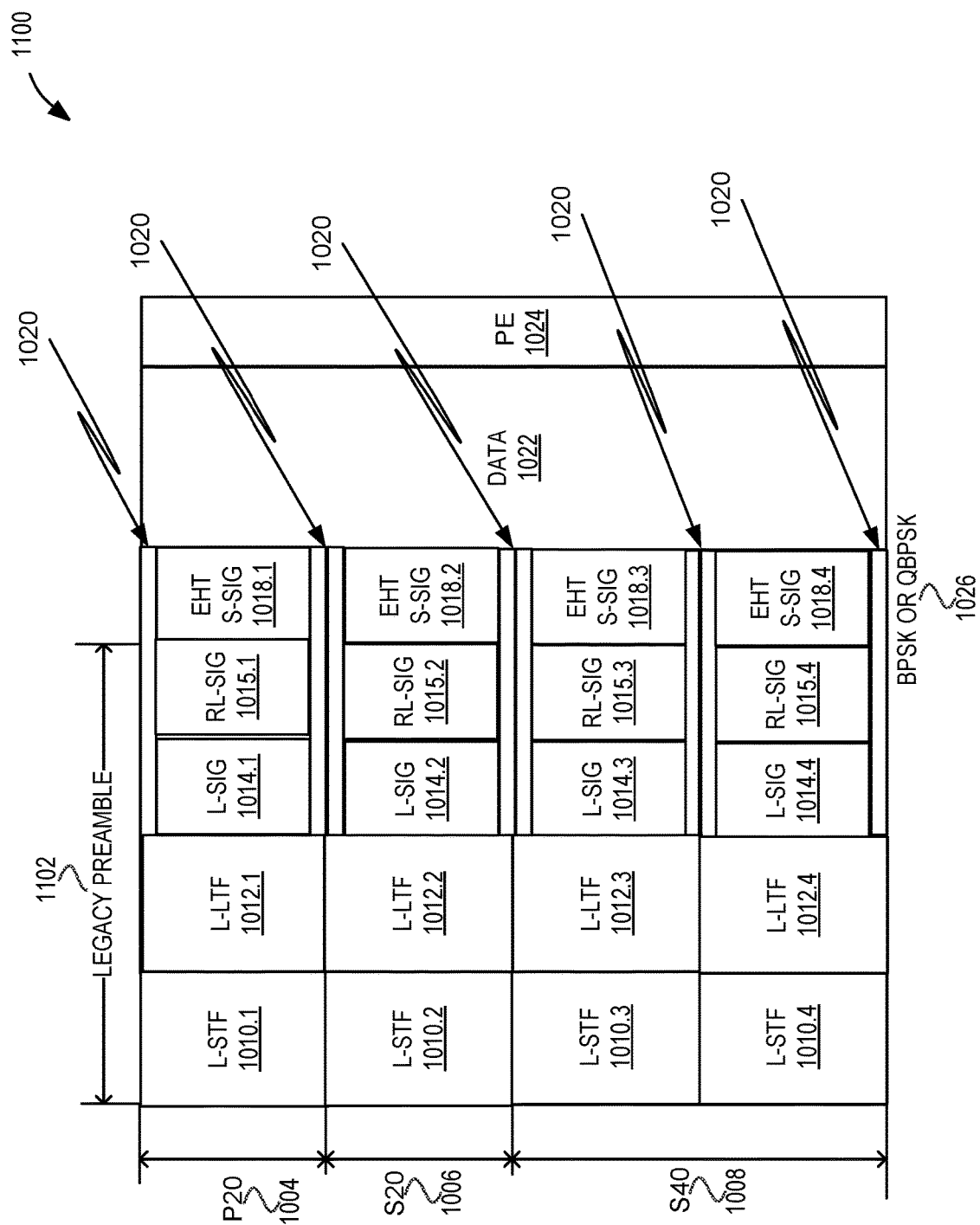
FIG. 11 illustrates a low-rate preamble, in accordance with some embodiments.

FIG. 10 illustrates a low-rate preamble 1000, in accordance with some embodiments. FIG. 11 illustrates a low-rate preamble 1100, in accordance with some embodiments. FIGS. 10 and 11 are disclosed in conjunction with one another. In some embodiments, station 504 and/or AP 502 are configured to transmit and/or receive low rate preamble 1000. In some embodiments, station 504 and/or AP 502 are configured to transmit and/or receive low-rate preamble 1000 on a 6 GHz band. In some embodiments, station 504 and/or AP 502 are configured to transmit a PPDU on one of the distributed RUs and contiguous RUs 800, 900 disclosed in FIGS. 8 and 9. In some embodiments, station 504 and/or AP 502 are configured to transmit a PPDU comprising the low-rate preamble 1000, 1100 (FIG. 11) on one of the distributed RUs and contiguous RUs 800, 900 disclosed in FIGS. 8 and 9. In some embodiments, low-rate preamble 1000, 1100 is a preamble to a PPDU that is a control frame.

Illustrated in FIGS. 10 and 11 are legacy preamble 1002, 1102, primary 20 MHz channel (P20), secondary 20 MHz channel (S20) 1006, secondary 40 MHz channel (S40) 1008, legacy short training field (L-STF) 1010, legacy long-training field (L-LTF) 1012, legacy signal field (L-SIG) 1014, EHT short signal field (EHT S-SIG) 1018, guard band 1020, data 1022, packet extension field (PE) 1024, and binary phase shift-keying (BPSK) or quadrature binary phase shift-keying (QBPSK) 1026.

In some embodiments, there may be fewer or a greater number of channels (e.g., 1004, 1006, 1008). For example, there may be a secondary 80 MHz channel. In some embodiments, the low-rate preamble 1000 for a PPDU is transmitted on different channels (e.g., 1004, 1006, 1008), e.g., on the P20 1004 only, P20 1004, S20 1006 only, S40 1008 only, a lower 20 MHz of the S40 1008, etc. Legacy preamble 1002 comprises L-STF 1010, L-LTF 1012, and L-SIG 1014.

The L-STF 1010 and L-LTF 1012 are training signals that may be the same or similar as legacy signals, e.g., as disclosed in IEEE 802.11. L-SIG 1014 is decoded by the receiver to determine decoding parameters. L-SIG 1014 includes a rate subfield and length subfield that may be used by stations 504, APs 502, and/or legacy devices 506 to determine a duration that may be used for a deferral duration or to decode a legacy PPDU (e.g., an IEEE 802.11a/b/j/p/g/n/ac/ah/ad/ax PPDU).

EHT S-SIG 1018 includes one or more of a bandwidth subfield 1050, MCS subfield 1052, and a packet type subfield 1054. EHT S-SIG 1018 may include other information such as a BSS color subfield, a spatial reuse subfield, an uplink/downlink (UL/DL) subfield 1060, and other information needed to (and/or determine whether to) decode the data 1022. The bandwidth field 1050 indicates a bandwidth of the PPDU with the low-rate preamble 1000, 1100, and the bandwidth of the data 1022. The MCS field 1052 indicates a modulation and coding scheme used to encode the data 1022. The packet type 1054 indicates a packet type, e.g., the low-rate PPDU. The station 504 and/or AP 502 may be configured to decode different types of packets and the preambles illustrated in FIGS. 10 and 11 may only be one type of EHT preamble. EHT S-SIG 1018 may include one or more additional fields that include other information. In some embodiments, EHT S-SIG 1018 enables the data 1022 to be transmitted over a larger bandwidth than a legacy PPDU. In some embodiments, the data rate realized by the data 1022 is greater than in a legacy PPDU. Station 504 and/or AP 502 may switch physical characteristics after decoding EHT S-SIG 1018, e.g., the subcarrier spacing and duration may change. Station 504 and/or AP 502 decode the EHT S-SIG 1018 and use the information decoded to decode the data 1022, in accordance with some embodiments.

In some embodiments, low-rate preamble 1000, 1100, defers non-EHT stations and AP, e.g., legacy stations 506. The deferral (e.g., setting of a NAV) is achieved by the legacy devices decoding the L-SIG 1014 and determining a duration. The legacy devices can then not decode the EHT S-SIG 1018 as the format is not known to the legacy devices. The legacy devices then defer for the remainder of the duration determined by the L-SIG 1014, in accordance with some embodiments.

In some embodiments, a legacy device 506 may encode a data field after the L-SIG 1014 that a station 504 and/or AP 502 that are configured to operate in accordance with EHT may interpret as a EHT S-SIG 1018. In some embodiments, the station 504 and/or AP 502 are configured to transmit EHT S-SIG 1018 in accordance with BPSK. In some embodiments, station 504 and/or AP 502 are configured to transmit EHT S-SIG 1018 in accordance with QBPSK. In some embodiments, when station 504 and/or AP 502 transmit EHT S-SIG 1018 in accordance with QBPSK, then the station 504 and/or AP 502 will not confuse a data field of a legacy transmission as the EHT S-SIG 1018 since the data field of the legacy transmission is transmitted in accordance with QBPSK.

The low-rate preambles 1000, 1100 are backward compatible with legacy preambles based on the transmission of the L-STF 1010, 1110, L-LTF 1012, 1112, and L-SIG 1014, 114 on each 20 MHz channel occupied by the low-rate preamble 1000, 1100, in accordance with some embodiments. Legacy device 506 will defer based on a duration in the L-SIG. In some embodiments, EHT S-SIG 1018 requires 4 us to transmit. In some embodiments, EHT may be termed "be", "next generation", or another term. In some embodiments, a legacy device 506 (e.g., IEEE 802.11n) may decode the EHT S-SIG 1018 as a field of a legacy PPDU and not respect the length or duration indicated in the L-SIG 1014 and interpret the EHT S-SIG 1018 as a legacy sig field.

In some embodiments, the station 504 and/or AP 502 are configured to transmit the L-SIG 1014 and EHT S-SIG 1018 without one or more of the guard band 1020 subcarriers so that the subcarriers can be trained for data 1022. In some embodiments, station 504 and/or AP 502 are configured to transmit data 1022 with subcarriers (or tones) punctured where the guard band 1020 subcarriers are. Illustrated in FIG. 11 is legacy preamble 1102, P20 1004, S20 1006, S40 1008, L-STF 1010, L-LTF 1012, L-SIG 1014, EHT S-SIG 1018, guard band 1020, data 1022, PE 1024, and BPSK or QBPSK 1026.

In some embodiments, station 504 and/or AP 502 are configured to transmit RL-SIG 1015 after L-SIG 1014 as part of the legacy preamble 1102. RL-SIG 1015 indicates to legacy devices 506 other than IEEE 802.11ax devices that the preamble is not intended for their protocol. The IEEE 802.11ax devices will then defer based on the EHT S-SIG 1018 since it is not in the format of an IEEE 802.11ax signal field (e.g., RE-SIG-A1) that succeeds the RL-SIG 1015. The RL-SIG 1015 may require 4 us to transmit. Station 504 and AP 502 may be able to reuse the detection state machine of a IEEE 802.11ax device and then detect the symbol after the RL-SIG 1015 to differentiate EHT low rate PPDU from IEEE 802.11ax or another protocol. In some embodiments, the probability that a IEEE 802.11a PPDU will be misinterpreted as a EHT PPDU is reduced as the RL-SIG 1015 structure is more complex than the structure of the EHT S-SIG 1018.

The station 504 and/or AP 502 may be configured to transmit the EHT S-SIG 1018 in BPSK 1026 and/or QBPSK 1026 after the RL-SIG 1015. The RL-SIG 1015 may be transmitted on each subchannel the L-SIG 1014 is transmitted on. The station 504 and/or AP 502 may be termed BE station 504, EHT station 504, BE AP 502, EHT AP 502, or another term. RL-SIG 1015 may include the same fields as the L-SIG 1014 with the same values indicated, but the RL-SIG 1015 may be transmitted with fewer muted subcarriers, e.g., edge subcarriers may be transmitted with the RL-SIG 1015 but not with the L-SIG 1014.

Figure 12:
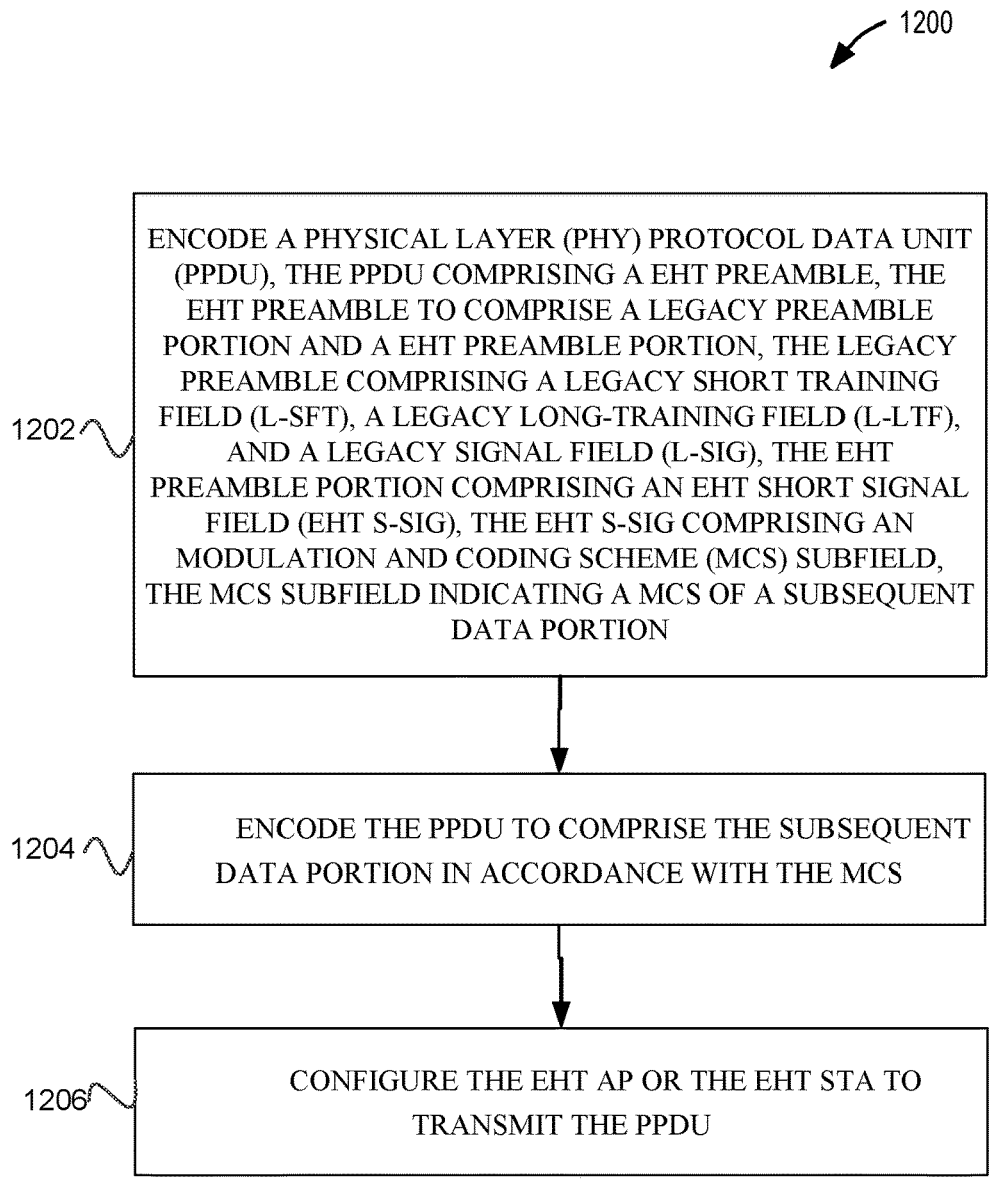
FIG. 12 illustrates a method for tone plans and preambles for extremely high throughput (EHT), in accordance with some embodiments.

FIG. 12 illustrates a method 1200 for tone plans and preambles for extremely high throughput (EHT), in accordance with some embodiments. The method 1200 begins at operation 1202 with encoding a PPDU, the PPDU including a EHT preamble, the EHT preamble including a legacy preamble portion and a EHT preamble portion, the legacy preamble comprising a L-SFT, a L-LTF, and a L-SIG, the EHT preamble portion including an EHT S-SIG, the EHT S-SIG including a MCS subfield, the MCS subfield indicating a MCS of a subsequent data portion. For example, a station 504 and/or AP 502 decodes a PPDU where the preamble to the PPDU is in accordance to a low-rate preamble 1000, 1100.

The method 1200 continues at operation 1204 with encoding the PPDU to comprise the subsequent data portion in accordance with the MCS. For example, station 504 and/or AP 502 may encode the data 1022 in accordance with the MCS 1052 indicated in the EHT S-SIG 1018.

The method 1200 continues at operation 1206 with configuring the EHT AP or the EHT STA to transmit the PPDU. For example, an apparatus of station 504 and/or AP 502 may configure the station 504 and/or AP 502 to transmit a PPDU in accordance with the fields of the EHT S-SIG 1018.

Method 1200 may include one or more additional operations. One or more of the operations may be optional. The operations 1200 may be performed in a different order.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an extremely high-throughput (EHT) access point (AP) or EHT station (STA), the apparatus comprising memory; and processing circuitry coupled to the memory, the processing circuitry configured to:

encode a physical layer (PHY) protocol data unit (PPDU), the PPDU comprising a EHT preamble, the EHT preamble to comprise a legacy preamble portion and a EHT preamble portion, the legacy preamble comprising a legacy short training field (L-STF), a legacy long-training field (L-LTF), and a legacy signal field (L-SIG), the EHT preamble portion comprising an EHT short signal field (EHT S-SIG), the EHT S-SIG comprising a bandwidth subfield indicating a bandwidth of the PPDU and a modulation and coding scheme (MCS) subfield, the MCS subfield indicating a MCS of a subsequent data portion;

encode the PPDU to comprise the subsequent data portion in accordance with the MCS and to span the bandwidth of the PPDU with punctured tones corresponding to punctured tones of the EHT preamble; and configure the EHT AP or the EHT STA to transmit the PPDU.

2. The apparatus of claim 1, wherein the processing circuitry is further configured to:

encode the legacy preamble to further comprise a repeat of the L-SIG (RL-SIG) after the L-SIG.

3. The apparatus of claim 1, wherein the processing circuitry is further configured to:

encode the EHT S-SIG to be transmitted in accordance with Quadrature Binary Phase Shift Keying (QBPSK); and configure the EHT AP or the EHT STA to transmit the PPDU with the EHT S-SIG transmitted in accordance with QBPSK.

4. The apparatus of claim 1, wherein the processing circuitry is further configured. to:

encode the EHT S-SIG to be transmitted in accordance with Binary Phase Shift Keying (BPSK); and configure the EHT AP or the EHT STA to transmit the PPDU with the EHT S-SIG transmitted in accordance with BPSK.

5. The apparatus of claim 1, wherein the EHT S-SIG further comprises a bandwidth field, the bandwidth field indicating a bandwidth of the PPM, and wherein the processing circuitry is further configured to:

encode the EHT preamble to repeat for each 20 MHz subchannel within the bandwidth of the PPDU; and encode the subsequent data portion in accordance with the MCS and to span the bandwidth of the PPDU.

6. The apparatus of claim 1, wherein the PPDU is a low rate mode preamble, and the processing circuitry is further configured to:

configure the EHT AP or the EHT STA to transmit the PPDU within one or more subchannels within a 6 GHz band.

7. The apparatus of claim 1, wherein the EHT S-SIG further comprises a bandwidth field, the bandwidth field indicating a bandwidth of the PPDU, and wherein the processing circuitry is further configured to:

encode the EHT preamble to repeat for each 20 MHz subchannel within the bandwidth of the PPDU, wherein the EHT preamble portion and the legacy preamble are encoded to comprise signals within legacy guard bands, the legacy guard bands between 20 MHz subchannels and at both edges of the bandwidth; and encode the subsequent data portion in accordance with the MCS and to span the bandwidth of the PPDU.

8. The apparatus of claim 1, wherein the processing circuitry is further configured to:

decode a packet comprising a resource unit (RU) allocation for the EHT AP or EHT STA to transmit the PPDU, wherein the RU allocation comprises two or more portions of contiguous subcarriers, and wherein configure the EHT AP or the EHT STA to transmit the PPDU further comprises:

configure the EHT AP or the EHT STA to transmit the PPDU on the two or more portions of contiguous subcarriers.

9. The apparatus of claim 1, wherein the processing circuitry is further configured to:

decode a packet comprising a resource unit (RU) allocation for the EHT AP or EHT STA to transmit the PPDU, wherein the RU allocation comprises a distributed RU allocation or a contiguous RU allocation, and wherein configure the EHT AP or the EHT STA to transmit the PPDU further comprises:

configure the EHT AP or the EHT STA to transmit the PPDU on the distributed RU allocation or the contiguous RU allocation, wherein the distributed RU allocation comprises two or more portions of contiguous subcarriers.

10. The apparatus of claim 1, wherein the processing circuitry is further configured to:

decode a packet comprising a resource unit (RU) allocation for the EHT AP or EHT STA to transmit the PPDU, wherein the RU allocation refrains from including subcarriers from more than one 20 MHz physical subchannels, and wherein configure the EHT AP or the EHT STA to transmit the PPDU further comprises:

configure the EHT AP or the EHT STA to transmit the PPDU on the RU allocation.

11. The apparatus of claim 10, wherein the 20 MHz physical subchannels are predetermined 20 MHz frequency ranges of a 2.4 GHz band, a 5 GHz band, or a 6 GHz band.

12. The apparatus of claim 1, wherein the processing circuitry comprises a field-programmable gate array (FPGA).

13. The apparatus of claim 1, further comprising transceiver circuitry coupled to the processing circuitry, the transceiver circuitry coupled to two or more patch antennas for receiving signaling in accordance with a multiple-input multiple-output (MIMO) technique.

14. The apparatus of claim 1, wherein the AP and the station are configured to operate in accordance with one or more of the following communication standards:

an Institute of Electrical and Electronic Engineers (IEEE) 802.11ax, an IEEE 802.11 extremely-high throughput (EHT), IEEE 802.11az, IEEE 802.11 ay/ad, IEEE 802.11be, and IEEE 802.11.

15. A method performed by an apparatus of an extremely high-throughput (EHT) access point (AP) or EHT station (STA), the method comprising:

encoding a physical layer (PHY) protocol data unit (PPDU), the PPDU comprising a EHT preamble, the EHT preamble to comprise a legacy preamble portion and a EHT preamble portion, the legacy preamble comprising a legacy short training field (L-STF), a legacy long-training field (L-LTF), and a legacy signal field (L-SIG), the preamble portion comprising an EHT short signal field (EHT S-SIG), the EHT S-SIG comprising a bandwidth subfield indicating a bandwidth of the PPDU and a modulation and coding scheme (MCS) subfield, the MCS subfield indicating a MCS of a subsequent data portion;

encoding the PPDU to comprise the subsequent data portion in accordance with the MCS and to span the bandwidth of the PPDU with punctured tones corresponding to punctured tones of the EHT preamble; and configuring the EHT AP or the EHT STA to transmit the PPDU.

16. The method of claim 15, wherein the EHT S-SIG further comprises a bandwidth field, the bandwidth field indicating a bandwidth of the PPDU, and wherein the method further comprises:

encoding the EHT preamble to repeat for each 20 MHz subchannel within the bandwidth of the PPDU; and encoding the subsequent data portion in accordance with the MCS and to span the bandwidth of the PPDU.

17. A non-transitory computer-readable storage medium that stores instructions for execution by one or more processors of an apparatus of an extremely high-throughput (EHT) access point (AP) or EHT station (STA), the instructions to configure the one or more processors to:
    decode a physical layer (PHY) protocol data unit (PPDU), the PPDU comprising a EHT preamble, the EHT preamble to comprise a legacy preamble portion and a EHT preamble portion, the legacy preamble comprising a legacy short training field (L-STF), a legacy long-training field (L-LTF), and a legacy signal field (L-SIG), the EHT preamble portion comprising an EHT short signal field (EHT S-SIG), the EHT S-SIG comprising a bandwidth subfield indicating a bandwidth of the PPDU and a modulation and coding scheme (MCS) subfield, the MCS subfield indicating a MCS of a subsequent data portion; and
    decode the subsequent data portion in accordance with the MCS and the bandwidth of the PPDU, wherein punctured tones of the subsequent data portion correspond with punctured tones of the EHT preamble.

18. The non-transitory computer-readable storage medium of claim 17, the instructions to further configure the one or more processors to:
    decode the EHT S-SIG in accordance with Quadrature Binary Phase Shift Keying (QBPSK); and
    determine the PPDU is an EHT PPDU based on the EHT S-SIG being decoded in accordance with QBPSK.

19. The non-transitory computer-readable storage medium of claim 17, wherein the instructions further configure the one or more processors to:
    encode the legacy preamble to further comprise a repeat of the L-SIG (RL-SIG) after the L-SIG.

\* \* \* \* \*

UNITED STATES PATENT AND TRADEMARK OFFICE
CERTIFICATE OF CORRECTION

PATENT NO. : 11,082,983 B2  
APPLICATION NO. : 16/566271  
DATED : August 3, 2021  
INVENTOR(S) : Chen et al.

Page 1 of 1

It is certified that error appears in the above-identified patent and that said Letters Patent is hereby corrected as shown below:

In the Claims

In Column 24, Line 52, in Claim 1, delete "circuity" and insert --circuitry-- therefor In Column 25, Line 20, in Claim 4, delete "configured." and insert --configured-- therefor In Column 25, Line 28, in Claim 5, delete "PPM," and insert --PPDU,-- therefor In Column 26, Line 46, in Claim 15, after "the", insert --EHT--

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*